United States Patent
Hagiya et al.

(10) Patent No.: US 7,545,605 B2
(45) Date of Patent: *Jun. 9, 2009

(54) METHOD FOR REDUCING PSA TILT THROUGH STANDOFF RELOCATION

(75) Inventors: Shinobu Hagiya, Kanagawa-ken (JP); Shigeo Nakamura, Kanagawa-ken (JP); Wing Chun Shum, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 250 days.

This patent is subject to a terminal disclaimer.

(21) Appl. No.: 11/152,947

(22) Filed: Jun. 15, 2005

(65) Prior Publication Data

US 2006/0285251 A1    Dec. 21, 2006

(51) Int. Cl.
*G11B 5/60* (2006.01)
(52) U.S. Cl. .................................... 360/234.5
(58) Field of Classification Search .............. 360/234.5, 360/234.6, 245.4, 245.5, 245.9
See application file for complete search history.

(56) References Cited

U.S. PATENT DOCUMENTS

| | | | |
|---|---|---|---|
| 5,138,507 A | 8/1992 | Zarouri et al. | |
| 5,473,488 A | 12/1995 | Gustafson et al. | |
| 5,729,889 A | 3/1998 | Goss | |
| 5,786,964 A * | 7/1998 | Sone et al. | 360/234.5 |
| 5,812,344 A * | 9/1998 | Balakrishnan | 360/245.9 |
| 5,880,908 A * | 3/1999 | Shiraishi et al. | 360/234.6 |
| 5,923,500 A | 7/1999 | Hagen | |
| 5,956,212 A | 9/1999 | Zhu | |
| 6,078,472 A * | 6/2000 | Mitoh et al. | 360/245.4 |
| 6,282,063 B1 | 8/2001 | Coon | |
| 6,318,624 B1 | 11/2001 | Pattanaik et al. | |
| 6,349,017 B1 * | 2/2002 | Schott | 360/234.6 |
| 6,459,549 B1 * | 10/2002 | Tsuchiya et al. | 360/245.9 |
| 6,523,250 B2 | 2/2003 | Erpelding et al. | |
| 6,697,228 B1 | 2/2004 | Mei et al. | |
| 6,741,425 B1 | 5/2004 | Wu et al. | |
| 6,801,398 B1 * | 10/2004 | Ohwe et al. | 360/234.6 |
| 6,940,694 B2 * | 9/2005 | Ohwe et al. | 360/234.6 |
| 6,965,499 B1 * | 11/2005 | Zhang et al. | 360/234.8 |
| 7,006,330 B1 * | 2/2006 | Subrahmanyam et al. | 360/234.5 |
| 7,006,331 B1 * | 2/2006 | Subrahmanyam et al. | 360/245.9 |
| 2003/0090839 A1 | 5/2003 | Segar et al. | |
| 2004/0143959 A1 | 7/2004 | Kamigama | |
| 2005/0195527 A1 * | 9/2005 | Yamaguchi | 360/234.5 |
| 2006/0087768 A1 * | 4/2006 | Erpelding et al. | 360/234.5 |

* cited by examiner

*Primary Examiner*—Angel A. Castro

(57) ABSTRACT

A head assembly for a data storage device. The head assembly has a suspension. The head assembly also includes a contact pad coupled to the suspension. The head assembly also includes a slider. The slider is coupled to the suspension at the slider mounting point. The slider mounting point is at least partially bounded by polyimide standoffs. The polyimide standoff closest to the contact pad is positioned to reduce the effect of the solder shrinkage moment.

18 Claims, 11 Drawing Sheets

Head Assembly 300

Head Assembly 300

Head Assembly 300

Head Assembly 500

Head Assembly 500

Head Assembly 700

Head Assembly 700

Head Assembly 900

Head Assembly 900

Head Assembly 1100

METHOD FOR REDUCING PSA TILT THROUGH STANDOFF RELOCATION

BACKGROUND

1. Field of the Invention

The present invention relates to head assemblies used in data storage devices, and more particularly to the manner in which a slider is affixed to the transducer suspension system.

2. Related Art

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

Some of the recent improvement has resulted from techniques relating to the integrated lead suspension (ILS). An ILS includes contact pads, typically made of copper, attached to the suspension. A slider is also attached to the suspension with epoxy or another adhesive, and the contact pads are connected to the slider by means of a solder ball. The Pico slider has a footprint of 1.25 mm by 1 mm, and sat directly on the suspension. The Femto slider has a footprint of 0.85 mm by 0.7 mm, meaning it has less than half the available surface area for bonding of the larger Pico slider. Further complicating this are process constraints, which require the presence of polyimide standoffs for the Femto slider to sit on which were not required for the Pico slider. These standoffs further reduce the available area for bonding of the slider by the adhesive. Other slider formats, such as the Pemto or Femto-L (0.7 mm wide, but greater than 0.85 mm long), also have reduced slider bonding areas and can benefit from the present invention.

When the solder ball cools and resolidifies, it shrinks. This exerts a moment, hereinafter the "solder shrinkage moment," on the Femto slider, with the polyimide standoff closest to the solder ball acting as a fulcrum. This moment is not adequately countered by the adhesive moment used to hold the Femto slider to the suspension, because of the very limited area for adhesive on the current suspension. This results in a pitch static attitude (PSA) tilt to the slider after solder ball bond termination. This PSA tilt pulls the slider out of the most desirable position.

SUMMARY

A head assembly for a data storage device. The head assembly has a suspension. The head assembly also includes a contact pad coupled to the suspension. The head assembly also includes a slider. The slider is coupled to the suspension at the slider mounting point. The slider mounting point is at least partially bounded by polyimide standoffs. The polyimide standoff closest to the contact pad is positioned to reduce the effect of the solder shrinkage moment.

DETAILED DESCRIPTION

A head assembly and a data recording device configured to use a head assembly are disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a through understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
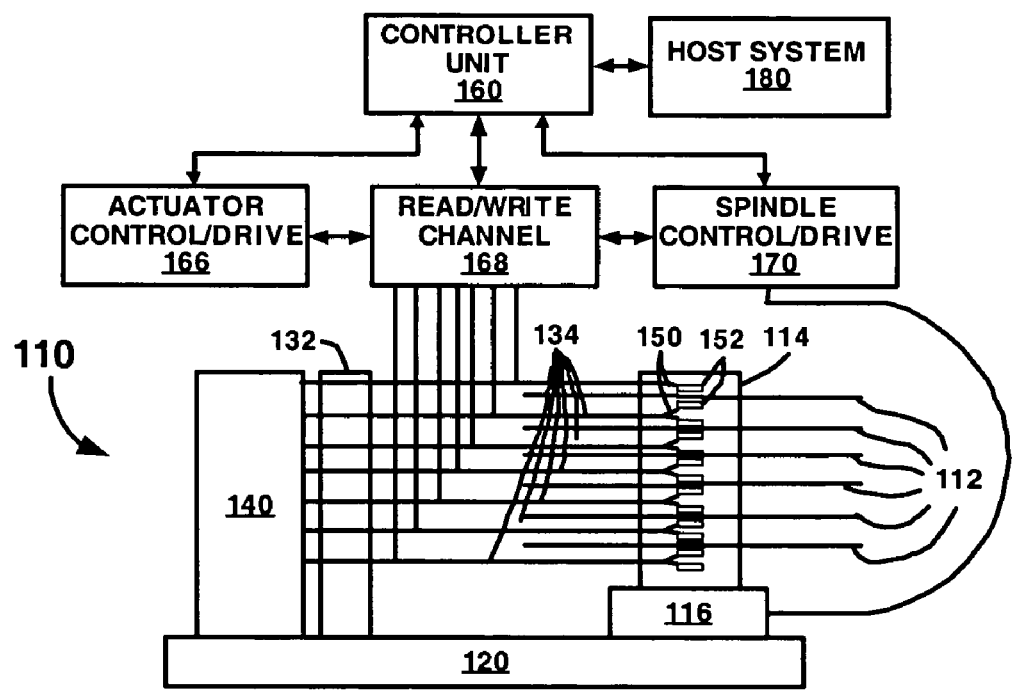
FIG. 1 is a side view of a hard disk drive and a controller unit in block form, in accordance with one embodiment of the present invention.
Figure 2:
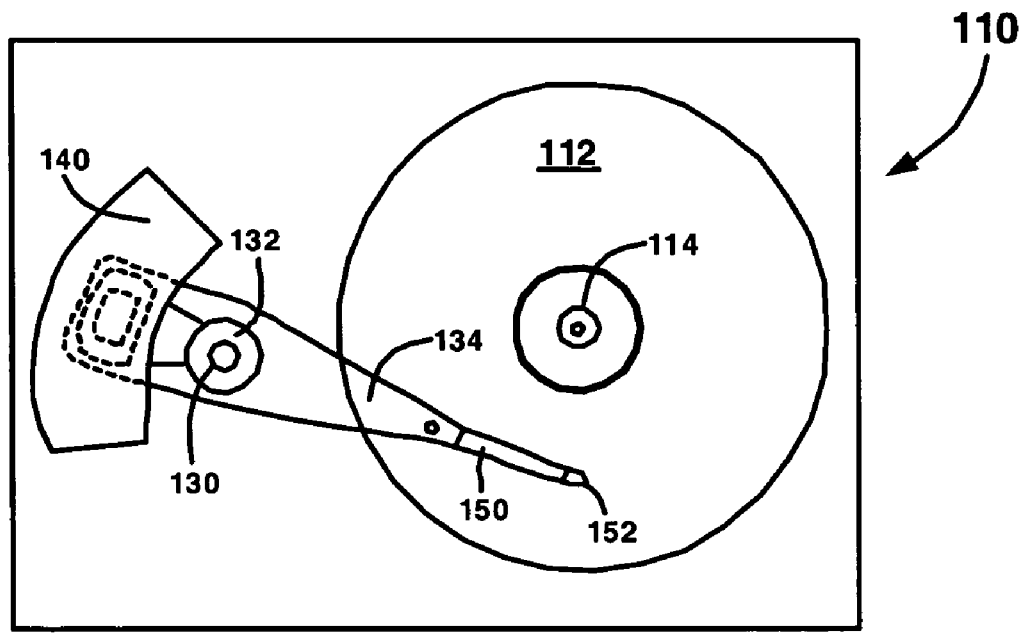
FIG. 2 is a top view of a hard disk drive system, in accordance with one embodiment of the present invention.

With reference now to FIGS. 1 and 2, a side and top view of a hard disk drive 110 is shown. Drive 110 has a disk pack having at least one media or magnetic disk 112, mounted to a spindle 114. A spindle motor 116 rotates the spindle 114 and the disk or disks 112. The spindle motor 114 and an actuator shaft 130 are attached to the chassis 120. A hub assembly 132 rotates about the actuator shaft 130 and supports a plurality of actuator arms 134, referred to as a "comb." A rotary voice coil motor 140 is attached to the chassis 120 and to a rear portion of the actuator arms 134.

A plurality of suspension assemblies 150 are attached to the actuator arms 134. A plurality of transducer heads or sliders 152 are attached respectively to the suspension assemblies 150. The sliders 152 are located proximate to the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller 160 is connected to an actuator control/drive unit 166 that in turn is connected to the rotary voice coil motor 140. This configuration allows controller 160 to control rotation of the disks 112. A host system 180, typically a computer system, is connected to the controller system 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Figure 3:
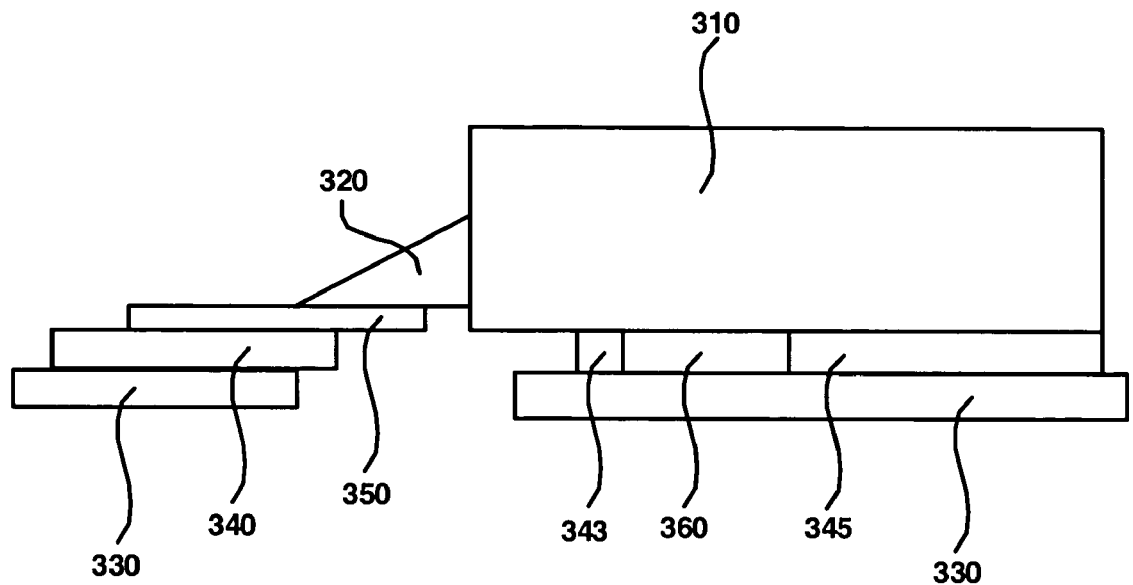
FIG. 3 is a side view of part of a head assembly where the polyimide standoffs have been resized and repositioned, in accordance with one embodiment of the present invention.
Figure 4:
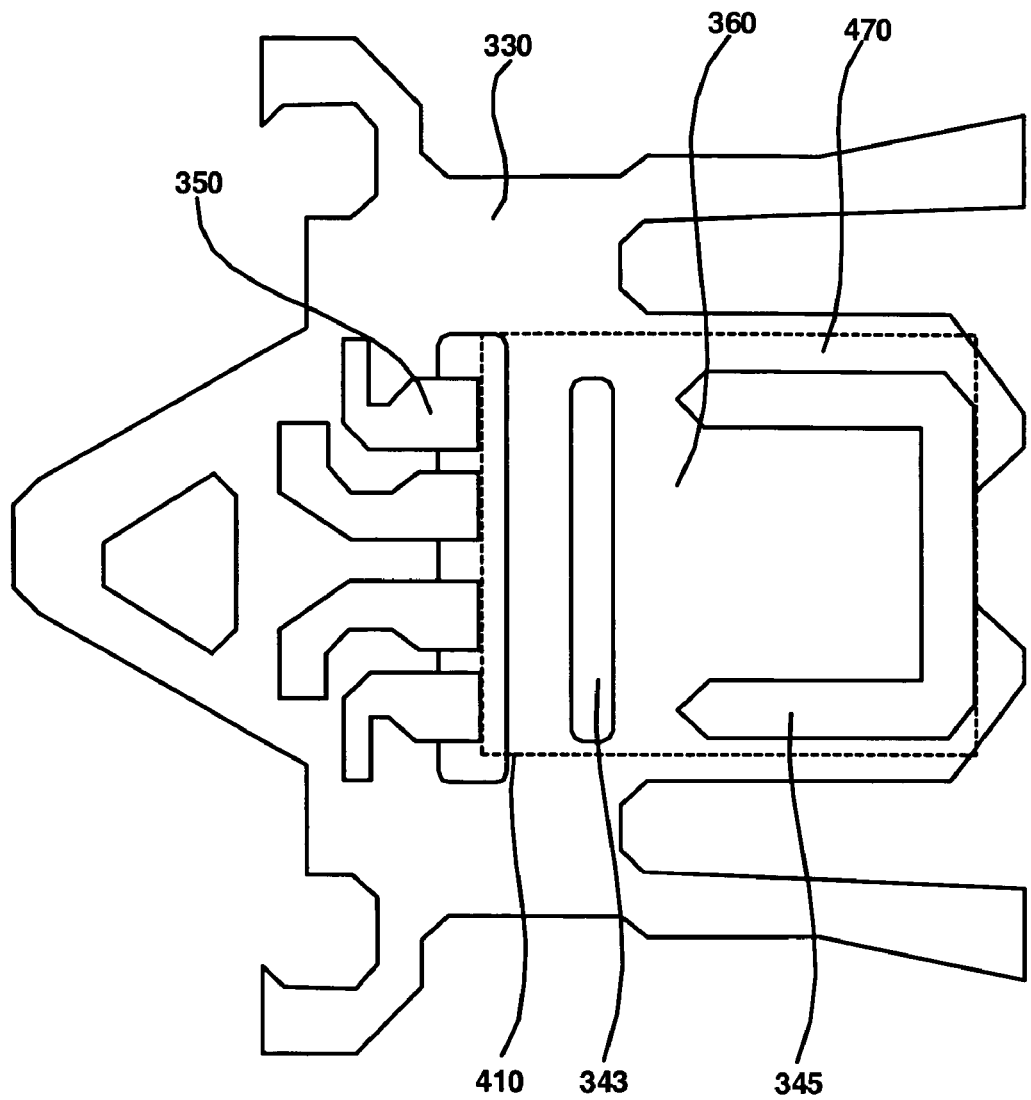
FIG. 4 is a top view of part of a head assembly where the polyimide standoffs have been resized and repositioned, in accordance with one embodiment of the present invention.

With reference now to FIGS. 3 and 4, side and top views of part of a head assembly 300 are depicted. FIG. 3 is a side view of head assembly 300, in accordance with one embodiment of the present invention. FIG. 4 is a top view of head assembly 300, with slider 310 and solder 320 removed, in accordance with one embodiment of the present invention. According to one embodiment, head assembly 300 includes an integrated lead suspension (ILS). In one embodiment, head assembly 300 has a stainless steel layer 330, which provides structural support for the head assembly 300. Polyimide standoffs 340, 343, and 345 sit atop stainless steel layer 330, and provide electrical isolation for further elements of head assembly 300. Polyimide standoffs 343 and 345 also partially bound adhesive pocket 360, and provide height control for slider 310. Adhesive pocket 360 contains an adhesive, such as epoxy, which bonds slider 310 to the head assembly 300. According to one embodiment, slider 310 is a femto slider. The region on stainless steel layer 330 directly underneath slider 310 is referred to as the slider mounting point. This region is represented by the dashed-line rectangle 410 on FIG. 4. The slider mounting point includes adhesive pocket 360 and polyimide standoffs 343 and 345. The gap between the edge of polyimide standoff 345 and the edge of the slider mounting point 410 is indicated by line 470. Contact pad 350 is connected to the read/write element contacts of slider 310 by solder 320. According to one embodiment, contact pad 350 is made of gold-plated copper. Any number of contact pads 350 may be utilized in embodiments of the present invention; one embodiment calls for four contact pads 350.

In one embodiment, polyimide standoffs 343 and 345 are sized and positioned in such a way so as to provide a larger adhesive pocket 360 than is available on previous head assemblies. In one embodiment, polyimide standoffs 343 and 345 are made narrower than is available on previous head assemblies, in order to provide a larger adhesive pocket 360. According to one embodiment, polyimide standoffs 343 and 345 are no wider than 0.08 mm, a limitation imposed by certain manufacturing processes. Standoffs used in older head assemblies were 0.11 mm wide. In another embodiment, polyimide standoffs 343 and 345 are shaped and positioned so as to allow for a larger adhesive pocket, with element 345 shaped and positioned in close proximity to the edge of the slider mounting point. One embodiment calls for element 345 to be positioned such that gap 470 is no more than 0.035 mm in width. Providing a larger adhesive pocket 360 allows for the application of more adhesive, which allows for a stronger surface tension force between stainless steel layer 330 and slider 310. A stronger surface tension force is better able to resist the solder shrinkage moment caused when solder 320 cools and resolidifies before the slider bonding adhesive is cured. So a larger adhesive pocket 360 leads to reduced PSA tilt when pre-curing or tack curing the slider bonding adhesive is not desirable due to process or functional reasons.

Figure 5:
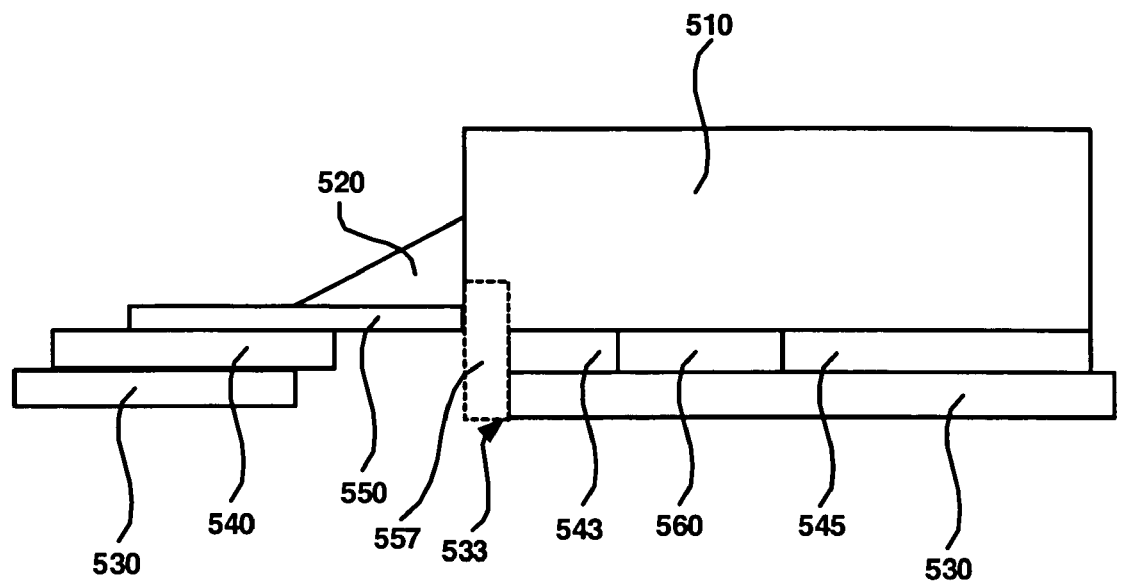
FIG. 5 is a side view of part of a head assembly where the polyimide standoff nearest the contact pads has been repositioned, in accordance with one embodiment of the present invention.
Figure 6:
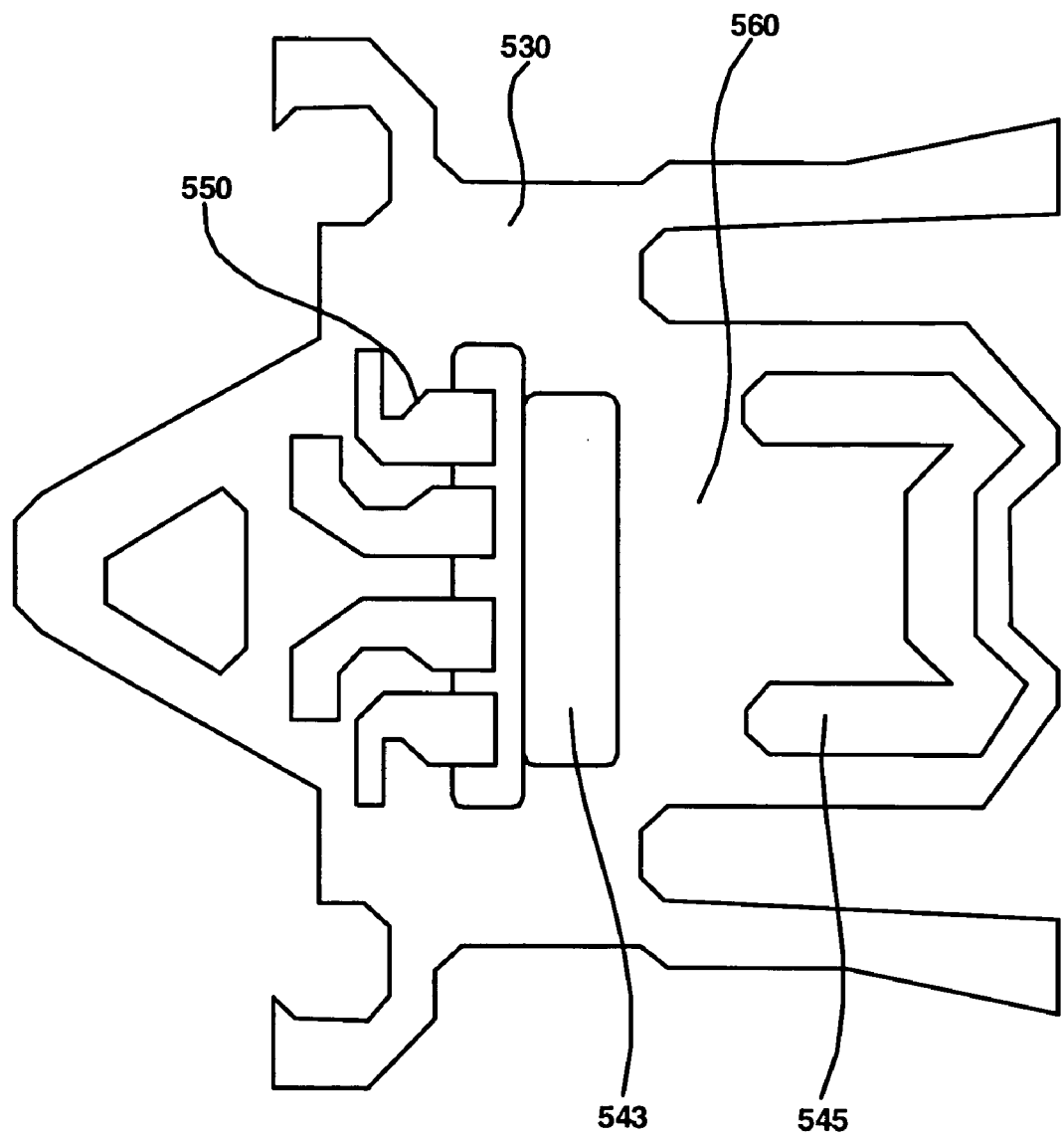
FIG. 6 is a top view of part of a head assembly where the polyimide standoff nearest the contact pads has been repositioned, in accordance with one embodiment of the present invention.

With reference now to FIGS. 5 and 6, side and top views of part of a head assembly 500 are depicted. FIG. 5 is a side view of head assembly 500, in accordance with one embodiment of the present invention. FIG. 6 is a top view of head assembly 500, with slider 510 and solder 520 removed, in accordance with one embodiment of the present invention. According to one embodiment, head assembly 500 includes an integrated lead suspension (ILS). In one embodiment, head assembly 500 has a stainless steel layer 530, which provides structural support for the head assembly 500. Polyimide standoffs 540, 543, and 545 sit atop stainless steel layer 530, and provide electrical isolation for further elements of head assembly 500. Polyimide standoffs 543 and 545 also partially bound adhesive pocket 560, and provide height control for slider 510. Adhesive pocket 560 contains an adhesive, such as epoxy, which bonds slider 510 to the head assembly 500. According to one embodiment, slider 510 is a femto slider. The region on stainless steel layer 530 directly underneath slider 510 is referred to as the slider mounting point. The slider mounting point includes adhesive pocket 560 and polyimide standoffs 543 and 545. Contact pad 550 is connected to the read/write element contacts of slider 510 by solder 520. According to one embodiment, contact pad 550 is made of gold-plated copper. Any number of contact pads 550 may be utilized in embodiments of the present invention; one embodiment calls for four contact pads 550.

In one embodiment, polyimide standoff 543 is positioned close to edge 533 of stainless steel layer 530. According to one embodiment, polyimide standoff 543 is 0.025 mm from the edge 533 of stainless steel layer 530, a limitation imposed by certain manufacturing tolerances to avoid polyimide overhanging the edge 533 of stainless steel layer 530. According to another embodiment, polyimide standoff 543 is flush with edge 533 of stainless steel layer 530. When solder 520 cools and resolidifies, polyimide standoff 543 functions as a fulcrum, i.e. it is the pivot point around which PSA tilt occurs. In older head designs, the polyimide standoff was positioned further from the edge of the stainless steel. Positioning polyimide standoff 543 close to the edge 533 of stainless steel layer 530 moves the fulcrum point, which shortens the moment arm, and reduces the effect of the solder shrinkage moment, thereby also reducing PSA tilt.

In another embodiment, contact pad 550 is positioned close to edge 533 of stainless steel layer 530, with the gap between contact pad 550 and edge 533 represented by the width of dashed-line box 557. According to one embodiment, the gap 557 between contact pad 550 and edge 533 of stainless steel layer 530 is 0.015 mm. According to another embodiment, the gap 557 between contact pad 550 and edge 533 of stainless steel layer 530 is greater than 0 mm. Contact pad 550 cannot be allowed to overlap edge 533 of stainless steel layer 530, as that would make contact pad 550 too inflexible, which would increase the solder shrinkage moment. According to another embodiment, the gap 557 between contact pad 550 and edge 533 of stainless steel layer 530 is no more than 0.06 mm. Allowing a gap 557 larger than 0.06 mm may allow for too short a free copper length, increasing the effect of the solder shrinkage moment. Moving contact pad 550 closer to edge 533 of stainless steel layer 530, and thereby reducing gap 557, has an effect similar to that of moving the fulcrum point; the closer contact pad 550 is positioned, the longer the free copper length. This reduces the effect of the solder shrinkage moment, thereby reducing the PSA tilt.

Figure 7:
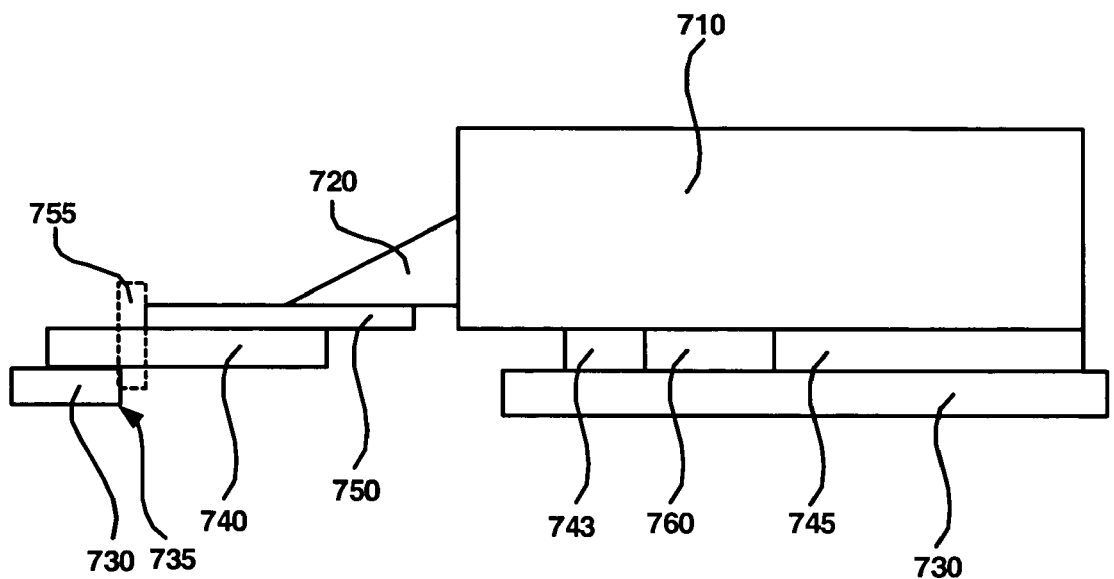
FIG. 7 is a side view of part of a head assembly where the contact pads do not overlap the stainless steel layer, in accordance with one embodiment of the present invention.
Figure 8:
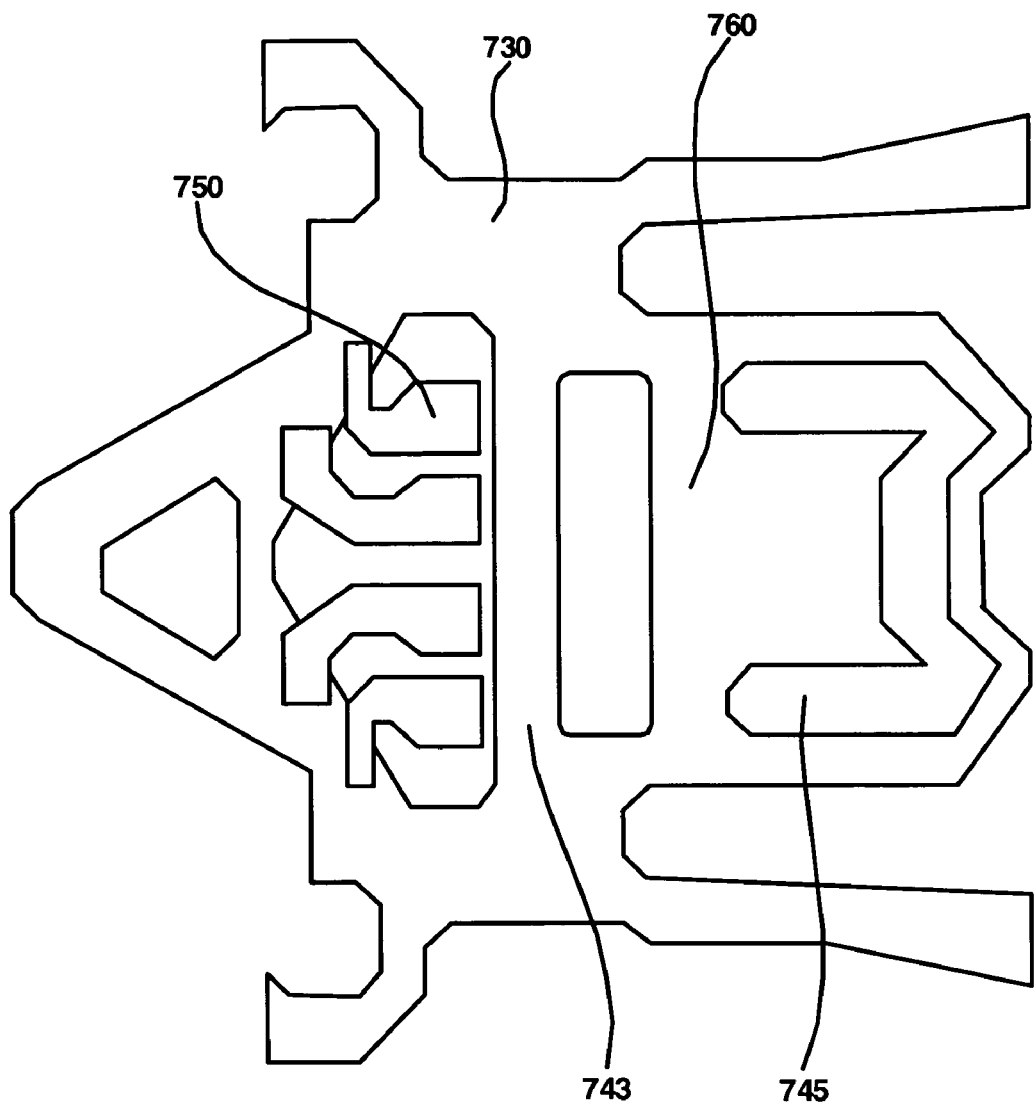
FIG. 8 is a side view of part of a head assembly where the contact pads do not overlap the stainless steel layer, in accordance with one embodiment of the present invention.

With reference now to FIGS. 7 and 8, side and top views of part of a head assembly 700 are depicted. FIG. 7 is a side view of head assembly 700, in accordance with one embodiment of the present invention. FIG. 8 is a top view of head assembly 700, with slider 710 and solder 720 removed, in accordance with one embodiment of the present invention. According to one embodiment, head assembly 700 includes an integrated lead suspension (ILS). In one embodiment, head assembly 700 has a stainless steel layer 730, which provides structural support for the head assembly 700. Polyimide standoffs 740, 743, and 745 sit atop stainless steel layer 730, and provide electrical isolation for further elements of head assembly 700. Polyimide standoffs 743 and 745 also partially bound adhesive pocket 760, and provide height control for slider 710. Adhesive pocket 760 contains an adhesive, such as epoxy, which bonds slider 710 to the head assembly 700. According to one embodiment, slider 710 is a femto slider. The region on stainless steel layer 730 directly underneath slider 710 is referred to as the slider mounting point. The slider mounting point includes adhesive pocket 760 and polyimide standoffs 743 and 745. Contact pad 750 is connected to the read/write element contacts of slider 710 by solder 720. According to one embodiment, contact pad 750 is made of gold-plated copper. Any number of contact pads 750 may be utilized in embodiments of the present invention; one embodiment calls for four contact pads 750.

In one embodiment, contact pad 750 is positioned such that it does not overlap stainless steel layer 730, as is indicated by the width of dashed-line box 755. According to one embodiment, a contact pad is a region on a copper trace on an ILS flexure that is dedicated to make connection with a slider read/write element contact. Its shape is generally different than the rest of the copper trace as a whole. Therefore it has a transitional region, which can be identified readily, leading into the main trace on the flexure. According to one embodiment, the gap 755 between edge 735 of stainless steel layer 730 and the transitional region of contact pad 750 is greater than 0 mm, such that the contact pad 750 is completely free of steel support. In older head assemblies, the contact pad was allowed to overlap the stainless steel. Positioning contact pad 750 such that it does not overlap stainless steel layer 730 allows for greater flexibility. When solder 720 cools and resolidifies, this increased flexibility in contact pad 750 reduces the effect of the solder shrinkage moment upon slider 710, thereby reducing PSA tilt. In embodiments involving multiple contact pads 750, the width of gap 755 between stainless steel edge 735 and the transitional region of contact pad 750 may differ for each contact pad 750. Allowing the gap 755 to differ in width allows for greater freedom in design of the flexure.

Figure 9:
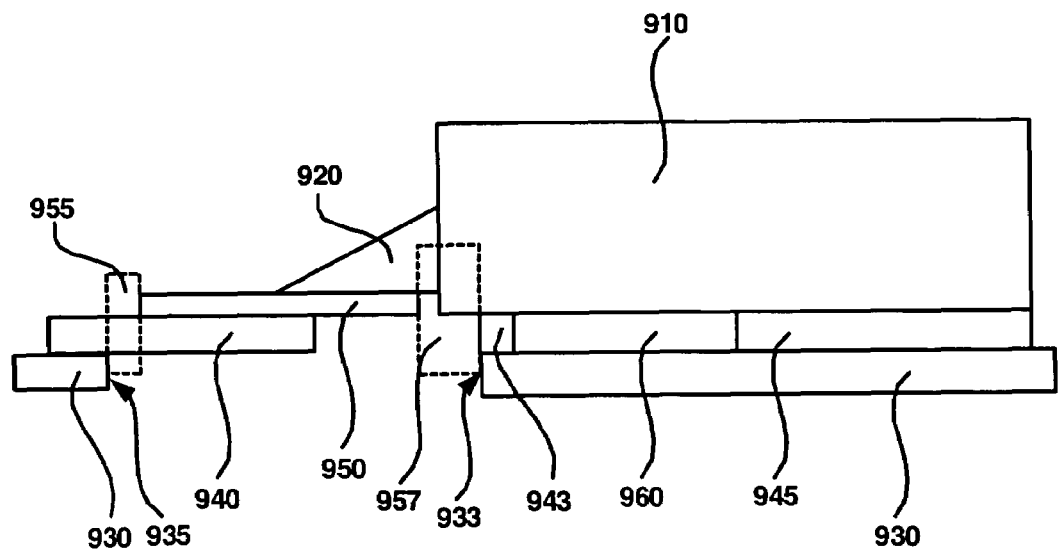
FIG. 9 is a side view of part of a head assembly where the polyimide standoffs have been resized and repositioned, the polyimide standoff nearest the contact pads has been repositioned, and the contact pads do not overlap the stainless steel layer, in accordance with one embodiment of the present invention.
Figure 10:
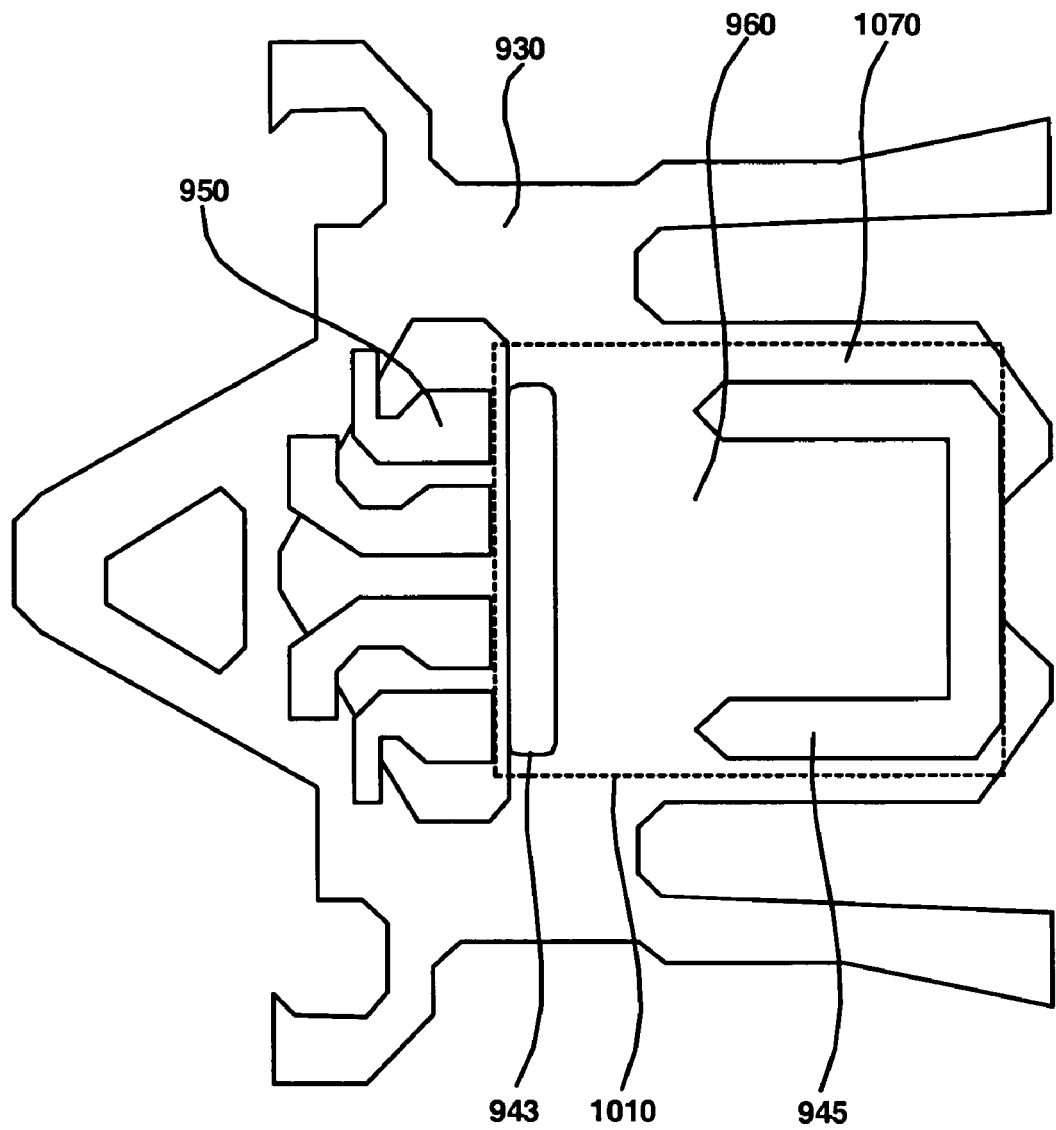
FIG. 10 is a top view of part of a head assembly where the polyimide standoffs have been resized and repositioned, the polyimide standoff nearest the contact pads has been repositioned, and the contact pads do not overlap the stainless steel layer, in accordance with one embodiment of the present invention.

With reference now to FIGS. 9 and 10, side and top views of part of a head assembly 900 are depicted. FIG. 9 is a side view of head assembly 900, in accordance with one embodiment of the present invention. FIG. 10 is a top view of head assembly 900, with slider 910 and solder 920 removed, in accordance with one embodiment of the present invention. According to one embodiment, head assembly 900 includes an integrated lead suspension (ILS). In one embodiment, head assembly 900 has a stainless steel layer 930, which provides structural support for the head assembly 900. Polyimide standoffs 940, 943, and 945 sit atop stainless steel layer 930, and provide electrical isolation for further elements of head assembly 900. Polyimide standoffs 943 and 945 also partially bound adhesive pocket 960, and provide height control for slider 910. Adhesive pocket 960 contains an adhesive, such as epoxy, which bonds slider 910 to the head assembly 900. According to one embodiment, slider 910 is a femto slider. The region on stainless steel layer 930 directly underneath slider 910 is referred to as the slider mounting point. This region is represented by the dashed-line rectangle 1010 on FIG. 10. The slider mounting point includes adhesive pocket 960 and polyimide standoffs 943 and 945. The gap between the edge of polyimide standoff 945 and the edge of the slider mounting point 1010 is indicated by line 1070. Contact pad 950 is connected to the read/write element contacts of slider 910 by solder 920. According to one embodiment, contact pad 950 is made of gold-plated copper. Any number of contact pads 950 may be utilized in embodiments of the present invention; one embodiment calls for four contact pads 950.

In one embodiment, polyimide standoffs 943 and 945 are sized and positioned in such a way so as to provide a larger adhesive pocket 960 than is available on previous head assemblies. In one embodiment, polyimide standoffs 943 and 945 are made narrower than is available on previous head assemblies, in order to provide a larger adhesive pocket 960. According to one embodiment, polyimide standoffs 943 and 945 are no wider than 0.08 mm, a limitation imposed by certain manufacturing processes. Standoffs used in older head assemblies were 0.11 mm wide. In another embodiment, polyimide standoffs 943 and 945 are shaped and positioned so as to allow for a larger adhesive pocket, with element 945 shaped and positioned in close proximity to the edge of the slider mounting point. One embodiment calls for element 945 to be positioned such that gap 1070 is no more than 0.035 mm in width. Providing a larger adhesive pocket 960 allows for the application of more adhesive, which allows for a stronger surface tension force between stainless steel layer 930 and slider 910. A stronger surface tension force is better able to resist the solder shrinkage moment caused when solder 920 cools and re-solidifies before the slider bonding adhesive is cured, and so a larger adhesive pocket 960 leads to reduced PSA tilt.

In one embodiment, polyimide standoff 943 is positioned close to edge 933 of stainless steel layer 930. According to one embodiment, polyimide standoff 943 is 0.025 mm from the edge 933 of stainless steel layer 930, a limitation imposed by certain manufacturing tolerances to avoid polyimide overhanging the edge 933 of stainless steel layer 930. According to another embodiment, polyimide standoff 943 is flush with edge 933 of stainless steel layer 930. When solder 920 cools and resolidifies, polyimide standoff 943 functions as a fulcrum, i.e. it is the pivot point around which PSA tilt occurs. In older head designs, the polyimide standoff was positioned further from the edge of the stainless steel. Positioning polyimide standoff 943 close to the edge 933 of stainless steel layer 930 moves the fulcrum point, which shortens the moment arm, and reduces the effect of the solder shrinkage moment, thereby also reducing PSA tilt.

In another embodiment, contact pad 950 is positioned close to edge 933 of stainless steel layer 930, with the gap between contact pad 950 and edge 933 represented by the width of dashed-line box 957. According to one embodiment, the gap 957 between contact pad 950 and edge 933 of stainless steel layer 930 is 0.015 mm. According to another embodiment, the gap 957 between contact pad 950 and edge 933 of stainless steel layer 930 is greater than 0 mm. Contact pad 950 cannot be allowed to overlap edge 933 of stainless steel layer 930, as that would make contact pad 950 too inflexible, which would increase the solder shrinkage moment. According to another embodiment, the gap 957 between contact pad 950 and edge 933 of stainless steel layer 930 is no more than 0.06 mm. Allowing a gap 957 larger than 0.06 mm may allow for too short a free copper length, increasing the effect of the solder shrinkage moment. Moving contact pad 950 closer to edge 933 of stainless steel layer 930, and thereby reducing gap 957, has an effect similar to that of moving the fulcrum point; the closer contact pad 950 is positioned, the longer the free copper length. This reduces the effect of the solder shrinkage moment, thereby reducing the PSA tilt.

In one embodiment, contact pad 950 is positioned such that it does not overlap stainless steel layer 930, as is indicated by the width of dashed-line box 955. According to one embodiment, the gap between edge 935 of stainless steel layer 930 and contact pad 950 is greater than 0 mm. In older head assemblies, the contact pad was allowed to overlap the stainless steel. Positioning contact pad 950 such that it does not overlap stainless steel layer 930 allows for greater flexibility. When solder 920 cools and resolidifies, this increased flexibility in contact pad 950 reduces the effect of the solder shrinkage moment upon slider 910, thereby reducing PSA tilt. In embodiments involving multiple contact pads 950, the width of gap 955 between stainless steel edge 935 and the transitional region of contact pad 950 may differ for each contact pad 950. Allowing the gap 955 to differ in width allows for greater freedom in design of the flexure.

Figure 11:
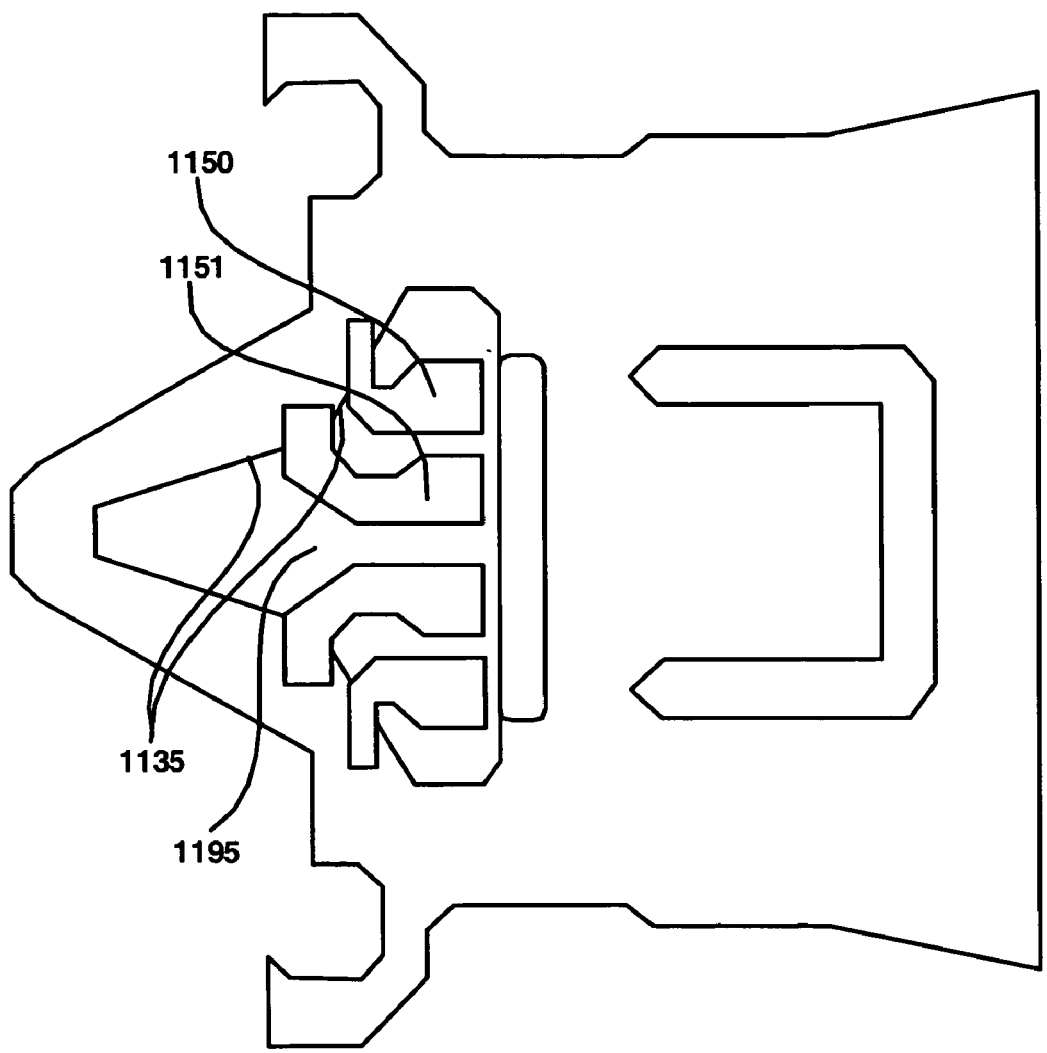
FIG. 11 is a top view of part of a head assembly where the polyimide standoffs have been resized and repositioned, the polyimide standoff nearest the contact pads has been repositioned, the contact pads do not overlap the stainless steel layer, and the distances between the contact pads and the stainless steel layer are vary such that only one window in the stainless steel layer is required, in accordance with one embodiment of the present invention.

With reference now to FIG. 11, a top view of head assembly 1100 is depicted, in accordance with one embodiment of the present invention. Head assembly 1100 includes multiple contact pads, including contact pads 1150 and 1151. The distance between the stainless steel edge 1135 of the flexure and the transitional portions of contact pads 1150 and 1151 differs substantially. According to one embodiment, these distances may vary such that a single large window in the stainless steel layer 1195 is created, rather than several small windows, as in other embodiments.

Those skilled in the art will recognize that several other combinations of solutions are possible as well. One embodiment of the present invention incorporates the resized and repositioned polyimide standoffs as shown in FIGS. 3 and 4, and the contact pads which do not overlap the stainless steel layer, as shown in FIGS. 7 and 8. Another embodiment incorporates the resized and repositioned polyimide standoffs, as shown in FIGS. 3 and 4, and the repositioned fulcrum point, as shown in FIGS. 5 and 6. Another embodiment incorporates the repositioned fulcrum point, as shown in FIGS. 5 and 6, and the contact pads which do not overlap the stainless steel layer, as shown in FIGS. 7 and 8.

Embodiments of the present invention described above thus relate to a head assembly as well as a data recording device configured to use a head assembly. While the present invention has been described in particular exemplary embodiments, the present invention should not be construed as limited by such embodiments, but rather construed according to the following claims and their equivalents.

What is claimed is:

1. A head assembly for a data storage device comprising:
a suspension;
a contact pad coupled to said suspension;
a slider coupled to said contact pad; and
a slider mounting point on said suspension, said slider mounting point including an adhesive pocket at least partially bounded by polyimide standoffs, wherein an edge of said polyimide standoff closest to said contact pad is positioned such that the effect of the solder shrinkage moment is reduced, said polyimide standoff no more than approximately 0.085 mm from the edge of said contact pad.

2. The head assembly of claim 1, wherein said suspension comprises an integrated lead suspension (ILS).

3. The head assembly of claim 1, wherein said contact pad is made of copper.

4. The head assembly of claim 1, wherein said slider comprises a femto format slider.

5. The head assembly of claim 1, wherein said slider comprises a Pemto or Femto-L format slider.

6. The head assembly of claim 1, wherein the edge of a stainless steel layer of said suspension is no more than 0.025 mm from the edge of said polyimide standoff.

7. The head assembly of claim 1, wherein the edge of a stainless steel layer of said suspension is no more than 0.06 mm from the edge of said contact pad.

8. A data recording device comprising:
a disk with a data surface of concentric data tracks;
a rotator for rotating said disk about an axis generally perpendicular to the disk;
a slider maintained in operative relationship with the data surface when the disk is rotating;
an integrated lead suspension (ILS) coupled to said slider, said ILS comprising a stainless steel layer;
a contact pad coupled to said slider, wherein the edge of the stainless steel layer of said ILS is no more than approximately 0.06 mm from an edge of said contact pad;
a slider mounting point on said suspension, said slider mounting point including an adhesive pocket at least partially bounded by polyimide standoffs, wherein an edge of said polyimide standoff closest to said contact pad is positioned such that the effect of the solder shrinkage moment is reduced;
a transducer attached to said slider for reading data from and writing data to the data surface;
an actuator for moving said slider generally radially to the disk to allow the transducer to access the data tracks; and
an electronics module for processing data read from and written to the data surface.

9. The data recording device of claim 8, wherein said contact pad is made of copper.

10. The data recording device of claim 8, wherein said slider comprises a femto format slider.

11. The data recording device of claim 8, wherein said slider comprises a Pemto or Femto-L format slider.

12. The data recording device of claim 8, wherein said polyimide standoff is no more than 0.085 mm from the edge of said contact pad.

13. The data recording device of claim 8, wherein the edge of the stainless steel layer of said ILS is no more than 0.025 mm from an edge of said polyimide standoff.

14. A head assembly for a data storage device comprising:
means for providing a suspension for reaching over a disk;
means for providing a contact pad coupled to said suspension;
means for providing a slider coupled to said contact pad; and
means for mounting said slider on said suspension, wherein said means for mounting includes a polyimide standoff, said standoff being positioned to reduce the effect of the solder shrinkage moment, wherein the edge of a stainless steel layer of said suspension is no more than approximately 0.025 mm from an edge of said polyimide standoff.

15. The head assembly of claim 14, wherein said means for providing a suspension comprises an integrated lead suspension (ILS).

16. The head assembly of claim 14, wherein said means for providing a contact pad is made of copper.

17. The head assembly of claim 14, wherein said means for providing a slider comprises a femto format slider.

18. The head assembly of claim 14, wherein said means for providing a slider comprises a Pemto or Femto-L format slider.

* * * * *